(12) United States Patent
Shepelev (10) Patent No.: US 10,261,626 B2
(45) Date of Patent: Apr. 16, 2019

(54) MITIGATING AUDIBLE NOISE IN A DISPLAY HAVING AN INTEGRATED TOUCH SENSOR

(71) Applicant: SYNAPTICS INCORPORATED, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/621,713

(22) Filed: Jun. 13, 2017

(65) Prior Publication Data

US 2018/0356932 A1 Dec. 13, 2018

(51) Int. Cl.
*G06F 3/044* (2006.01)
*G06F 3/041* (2006.01)
*G09G 3/20* (2006.01)

(52) U.S. Cl.
CPC .......... *G06F 3/0416* (2013.01); *G06F 3/044* (2013.01); *G09G 3/2092* (2013.01); *G09G 2310/061* (2013.01); *G09G 2310/08* (2013.01); *G09G 2354/00* (2013.01)

(58) Field of Classification Search
CPC .......................... G06F 3/044; G09G 2310/061
See application file for complete search history.

(56) References Cited

U.S. PATENT DOCUMENTS

| | | |
|---|---|---|
| 2010/0164964 A1 | 7/2010 | Sakariya et al. |
| 2013/0057511 A1 | 3/2013 | Shepelev et al. |
| 2013/0141473 A1* | 6/2013 | Moon .............. G09G 3/003 345/690 |
| 2013/0194229 A1 | 8/2013 | Sabo et al. |
| 2014/0049507 A1 | 2/2014 | Shepelev et al. |
| 2015/0091864 A1 | 4/2015 | Reynolds |
| 2015/0261356 A1 | 9/2015 | Shepelev et al. |
| 2016/0195957 A1 | 7/2016 | Reynolds et al. |
| 2016/0370915 A1* | 12/2016 | Agarwal .............. G06F 3/0416 |
| 2017/0003804 A1* | 1/2017 | Sung .............. G06F 3/0412 |
| 2017/0046006 A1 | 2/2017 | Kim et al. |
| 2017/0060340 A1 | 3/2017 | Chen et al. |

FOREIGN PATENT DOCUMENTS

KR 10-2016-0124872 A 10/2016

OTHER PUBLICATIONS

International Search Report and Wriitten Opinion, Application No. PCT/US2018/032106, dated Nov. 29, 2018, consists of 10 pages.

* cited by examiner

*Primary Examiner* — Dennis P Joseph
(74) *Attorney, Agent, or Firm* — Patterson + Sheridan, LLP (57) ABSTRACT

An example method of driving a display having a touch sensor includes: generating a plurality of display frames having an alternating sequence of display and blanking periods; supplying pixel line data to the display during the display periods and sensing signals to the touch sensor during the blanking periods; and timing the blanking periods so that display frames of a first type each have a first number of the blanking periods and that display frames of a second type each have a second number of the blanking periods, the second number less than the first number.

28 Claims, 6 Drawing Sheets

MITIGATING AUDIBLE NOISE IN A DISPLAY HAVING AN INTEGRATED TOUCH SENSOR

BACKGROUND

Field of the Disclosure

Embodiments of disclosure generally relate to electronic circuits and, more particularly, to techniques for mitigating audible noise in a display having an integrated touch sensor.

Description of the Related Art

Input devices including proximity sensor devices (also commonly called touchpads or touch sensor devices) are widely used in a variety of electronic systems. A proximity sensor device can include a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in displays of mobile phones). A proximity sensor can include a large number of parallel channels for processing signals resulting from touch sensing operations. Thus, the complexity and cost for each channel is critical.

SUMMARY

In an embodiment, a method of driving a display having a touch sensor includes: generating a plurality of display frames having an alternating sequence of display and blanking periods; supplying pixel line data to the display during the display periods and sensing signals to the touch sensor during the blanking periods; and timing the blanking periods so that display frames of a first type each have a first number of the blanking periods and that display frames of a second type each have a second number of the blanking periods, the second number less than the first number.

In another embodiment, a processing system for a display having a touch sensor includes: display driver circuitry configured to generate a plurality of display frames having an alternating sequence of display and blanking periods, and supply pixel line data to the display during the display periods; sensor circuitry configured to supply sensing signals to the touch sensor during the blanking periods; and control circuitry configured to time the blanking periods so that display frames of a first type each have a first number of the blanking periods and that display frames of a second type each have a second number of the blanking periods, the second number less than the first number.

In another embodiment, an input device includes: a display; a touch sensor integrated in the display; and a processing system, including: display driver circuitry configured to generate a plurality of display frames having an alternating sequence of display and blanking periods, and supply pixel line data to the display during the display periods; sensor circuitry configured to supply sensing signals to the touch sensor during the blanking periods; and control circuitry configured to time the blanking periods so that display frames of a first type each have a first number of the blanking periods and that display frames of a second type each have a second number of the blanking periods, the second number less than the first number.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

Figure 1:
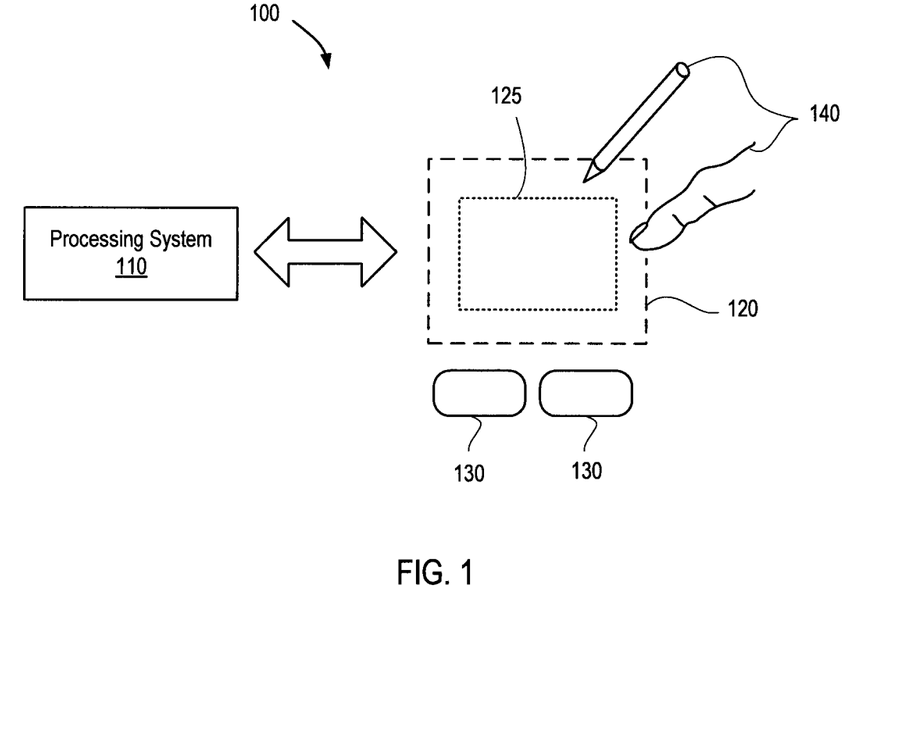
FIG. 1 is a block diagram of an exemplary input device, according to one embodiment described herein.

FIG. 1 is a block diagram of an exemplary input device 100, in accordance with embodiments of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Example communication protocols include Inter-Integrated Circuit (I²C), Serial Peripheral Interface (SPI), Personal System/2 (PS/2), Universal Serial Bus (USB), Bluetooth®, Radio Frequency (RF), and Infrared Data Association (IrDA) communication protocols.

In FIG. 1, the input device 100 is shown as a proximity sensor device (also often referred to as a "touchpad" or a "touch sensor device") configured to sense input provided by one or more input objects 140 in a sensing region 120 using sensor electrodes 125. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, in some embodiments, sensing input may comprise no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes 125 reside, by face sheets applied over the sensor electrodes 125 or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes 125. Some capacitive implementations utilize resistive sheets, which may be uniformly resistive.

Some capacitive implementations utilize "self-capacitance" (or "absolute capacitance") sensing methods based on changes in the capacitive coupling between sensor electrodes 125 and an input object. In various embodiments, an input object near the sensor electrodes 125 alters the electric field near the sensor electrodes 125, thus changing the measured capacitive coupling. In one implementation, an absolute capacitance sensing method operates by modulating sensor electrodes 125 with respect to a reference voltage (e.g. system ground), and by detecting the capacitive coupling between the sensor electrodes 125 and input objects.

Some capacitive implementations utilize "mutual capacitance" (or "transcapacitance") sensing methods based on changes in the capacitive coupling between sensor electrodes 125. In various embodiments, an input object near the sensor electrodes 125 alters the electric field between the sensor electrodes 125, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be electrically modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 125 may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes 125 and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes 125. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes 125 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
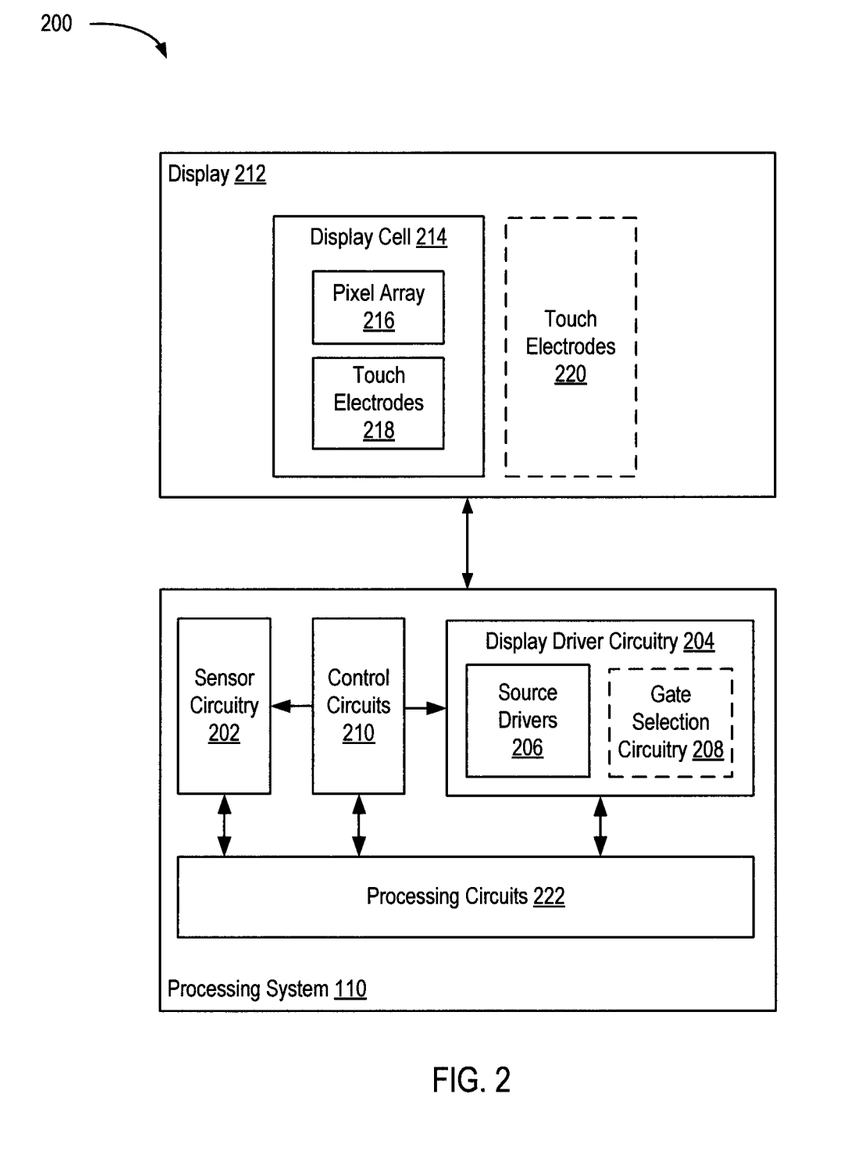
FIG. 2 is a block diagram depicting a processing system coupled to a display of an input device according to an embodiment.

FIG. 2 is a block diagram depicting the processing system 110 coupled to a display 212 of the input device 100 according to an embodiment. The display 212 includes a display cell 214. The display cell 214 includes a pixel array 216 and touch electrodes 218. The pixel array 216 includes rows and columns of pixels. Each pixel includes a light-emitting element and associated driving circuitry. For example, the pixels can be implemented using liquid crystal display (LCD), light-emitting diode (LED), organic LED (OLED), and the like technology. The driving circuitry of the pixel array 216 can be implemented using thin-film transistor (TFT) circuits.

The touch electrodes 218 comprise conductive elements disposed in the display cell 214. The touch electrodes 218 can be dedicated for the function of capacitive touch sensing or can function for both capacitive touch sensing and display updating. For example, in an LCD display, the touch electrodes 218 can be segments of a common electrode (e.g., segments of a VCOM electrode). In an LED display, the touch electrodes 218 can be anodes or cathodes of LEDs in the pixel array 216. In still other examples, the touch electrodes 218 can be source lines, gate lines, or other conductive lines disposed in the display cell 214. The touch electrodes 218 can be disposed on a substrate within one or more layers. The touch electrodes 218 can be arranged in various patterns, such as bars, bars and stripes, matrix patterns, or the like. In an embodiment, the display 212 also includes additional touch electrodes 220 dispose outside of the display cell 214 (e.g., on the display cell 214 or on some other substrate or layer above or below the display cell 214). For example, the touch electrodes 220 can be disposed on a color filter substrate above the display cell 214, on a cover substrate above the display cell 214, or the like. The touch electrodes 220 can form a pattern with the touch electrodes 218 (e.g., a bars and stripes pattern). In an embodiment, the touch electrodes 218 and the touch electrodes 220 are used as transmitters and receivers or receivers and transmitters, respectively.

The processing system 110 includes sensor circuitry 202, control circuits 210, display driver circuitry 204, and processing circuits 222. The sensor circuitry 202 includes analog or both analog and digital circuits configured to operate the touch electrodes 218, 220 to perform capacitive sensing of input objects touching or in proximity with the display 212. The sensor circuitry 202 can include charge measurement circuits (e.g., charge integrators, current conveyors, etc.), demodulators, filters, analog-to-digital converters (ADCs), and the like. The sensor circuitry 202 operators to generate resulting signals from the touch electrodes 218 or the touch electrodes 220 that are indicative of changes in capacitance due to input object(s). The sensor circuitry 202 can perform absolute capacitive sensing, transcapacitive sensing, or both.

The display driver circuitry 204 includes source drivers 206. The source drivers 206 are coupled to source lines in the display cell 214 for driving data to the pixel array 216, where the data includes image(s) to be displayed. The source drivers 206 can be coupled to the source lines in the display cell 214 through demultiplexer circuits, which can be part of the display driver circuitry 204 or part of the display cell 214 (e.g., formed using TFT layers). The source drivers 206 provide data to the pixel array 216 one line at a time. Gate selection circuitry 208 is coupled to gate lines in the display cell 214 for selecting different lines (e.g., different rows) to receive data from the source drivers 206. In an embodiment, the gate selection circuitry 208 is integrated in the display 212 (e.g., using TFT layers of the display cell 212). Alternatively, the gate selection circuitry 208 can be part of the display driver circuitry 204.

The control circuits 210 are coupled to both the sensor circuitry 202 and the display driver circuitry 204. The control circuits 210 can include registers, multiplexers, combinatorial logic, state machine(s), or the like. The control circuits 210 operate to control various aspects of the sensor circuitry 202 and the display driver circuitry 204, as discussed further herein. The processing circuits 222 include processor(s), memory, input/output (IO) circuits, and the like. The processing circuits 222 can be coupled to the sensor circuitry 202, the control circuits 210, and the display driver circuitry 204. The processing circuits 222 can provide commands to the control circuit 210 to set the parameters of the sensor circuitry 202 and the display driver circuitry 204. The processing circuits 222 can receive resulting signals from the sensor circuitry 202. The processing circuits 222 can provide image data to the display driver circuitry 204 to be displayed on the display 212. The processing circuits 222 can include a graphics processing unit (GPU) or can receive image data from an external GPU or the like. In another embodiment, the display driver circuitry 204 can receive image data directly from an external GPU or the like (as opposed to receiving the image data from the processing circuits 222). The processing circuits 222 can include software, firmware, hardware, or a combination thereof to perform various functions, such as providing commands to the control circuits 210, processing resulting signals from the sensor circuitry 202 to determine changes in capacitance and object detection, and the like.

Figure 3:
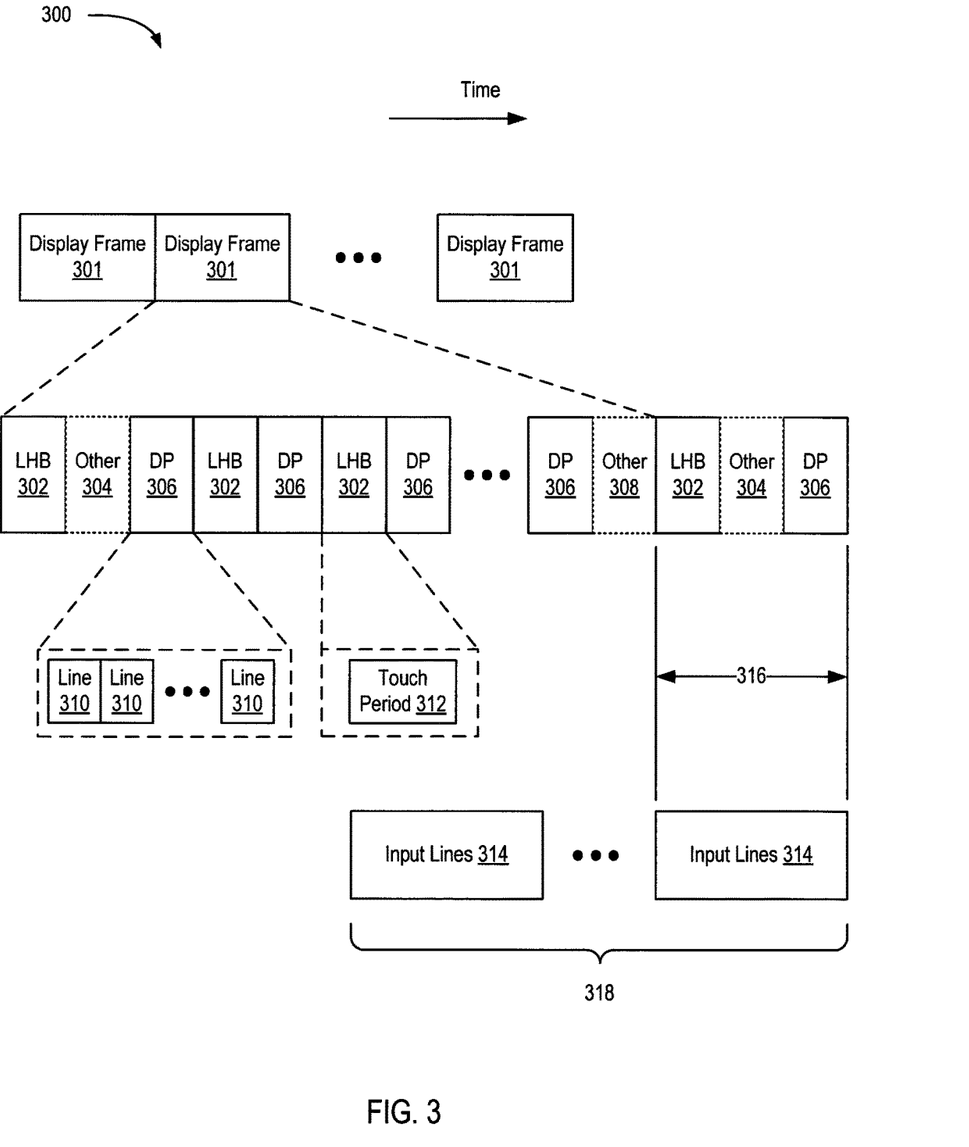
FIG. 3 is a block diagram that depicts a display frame structure according to an embodiment.

FIG. 3 is a block diagram that depicts a display frame structure 300 according to an embodiment. The display driver circuitry 204 receives display data and generates a sequence of display frames 301 as output. The display frames 301 can be output at a constant or substantially constant frame rate (e.g., 60 frames per second (FPS)). Each display frame 301 includes an alternating sequence of blanking periods and display periods (DPs). The blanking periods are referred to herein as long horizontal blanking periods or "LHBs". As shown in FIG. 3, a display frame 301 includes LHBs 302 and DPs 306 in an alternating sequence. The beginning and the end of the display frame 301 can include other periods (e.g., other period 304 and other period 308) inserted between an LHB 302 and a DP 306. The other periods 304, 308 can include a back porch period, a front porch period, dummy lines, and the like.

Each DP 306 includes a plurality of lines 310. Each line 310 includes pixel data for updating a row of pixels in the pixel array 216. In general, each DP 306 can include the same number of lines. In an embodiment, a first DP 306 in the display frame 301 can include a different number of lines than each other DP 306 (which include the same number of lines). Thus, the width (duration) of the DP 306 is measured in terms of a number of lines 310. Each line 310 includes a duration referred to as a line time.

Each LHB 302 also has a width of a plurality of lines (e.g., an integer multiple of the line time). Each LHB 302 includes a touch period 312. The touch period 312 can have a width that is the same as or less than the width of the LHB 302. During a touch period 312, the sensor circuitry 202 drives the touch electrodes with sensing signals for capacitive sensing. In an embodiment, the sensor circuitry 202 operates using a sequence of discrete touch bursts (also referred to as "bursts"). The sensor circuitry 202 dries the touch electrodes with sensing signals during each touch burst and does not drive the touch electrodes with sensing signals between touch bursts. The touch period 312 can include a certain number of touch bursts.

The input data to the display driver circuitry 204 is also formatted into frames 318. The duration of each display frame 301 can be the same as the duration of each frame 318 of the input data. Each frame 318 of the input data includes groups of input lines 314. A combined width 316 of an LHB 302, optionally the other period 304, and the DP 306 is equal to a width of an input line group 314. For example, a group of input lines 314 can include 50 lines. The data for the 50 lines is compressed into a DP 306 of the display frame 301. The line time is shortened to make room for the LHB 302 and optionally the other period 304. Within an input frame 318, each group of lines 314 can include the same number of lines. Optionally, one of the groups of input lines 314 (e.g., a first group) can include more lines than each other group of input lines 314 (which include the same number of lines).

Figure 4:
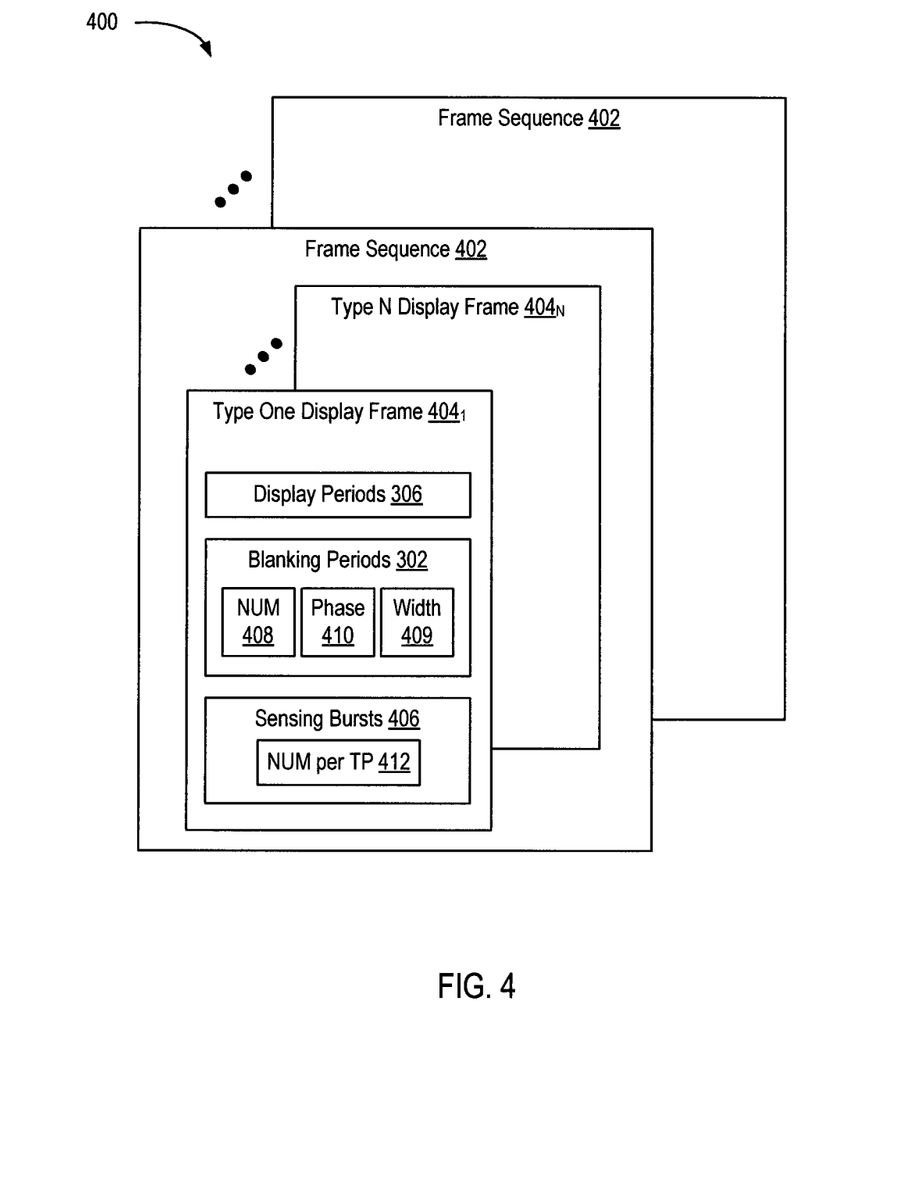
FIG. 4 is a block diagram depicting a logical arrangement of display frames generated by display driver circuitry according to an embodiment.

FIG. 4 is a block diagram depicting a logical arrangement of display frames generated by the display driver circuitry 204 according to an embodiment. In some cases, a sequence of LHBs 302 in the display frames output by the display driver circuitry 204 can cause an audible noise to be emitted from the input device 100. In embodiments described herein, the sequence of LHBs 302 is altered in at least one of two ways to mitigate audible noise. In a first timing scheme, the number and width of LHBs 302 is varied from one frame to the next. In a second timing scheme, the position of the LHBs 302 within each display frame 301 is varied from one frame to the next. In some embodiments, both the first and second timing schemes can be employed to mitigate audible noise. The timing schemes spread the spectrum of any generated noise so as to become inaudible or substantially inaudible.

In the first timing scheme, the display frames 301 are divided into frame sequences 402. Each frame sequence 402 includes a plurality of display frames of different types. In general, a frame sequence 402 can include N frame types resulting in N different types of frames $404_1$ through $404_N$ (where N is an integer greater than one). Each type of display frame 404 includes a sequence of display periods 306, a sequence of blanking periods (e.g., LHBs 302), and a sequence of sensing bursts 406. The blanking periods 302 are interleaved with the display periods 306, as shown in FIG. 3 and described above. The sensing bursts 406 occur within the blanking periods 302, as shown in FIG. 3 and described above. Each type of display frame 404 has a unique number 408 of blanking periods 302 and a unique width 409 of the blanking periods 302. That is, the number 408 and the width 409 of the blanking periods 302 varies across the types of display frames $404_1 \ldots 404_N$. Varying the number and width of the blanking periods 302 implements the first type of timing scheme discussed above. In an embodiment, the total number of sensing bursts 406 is constant from frame-to-frame. Thus, a number 412 of sensing bursts per touch period changes across the types of frames $404_1 \ldots 404_N$ in the first timing scheme.

In an embodiment, the number 408 of the blanking periods 302 can have one of a plurality of discrete values. Likewise, the width 409 of the blanking periods 302 can have one of a plurality of discrete widths. In an embodiment, the plurality of discrete values for each of the number 408 and the width 409 of the blanking periods 302 either increases or decreases monotonically. Table 1 illustrates an example configuration of the first timing scheme:

TABLE 1

| Display Frame # in Frame Sequence | LHB period (time) | Number of LHBs in one display frame |
|---|---|---|
| 1 | X | Y |
| 2 | 2*X | Y/2 |
| 3 | 3*X | Y/3 |
| ... | ... | ... |
| N | N*X us | Ceiling(Y/N) |

In Table 1, the number 408 of the blanking periods 302 decreases monotonically, while the width 409 of the blanking periods 302 increases monotonically, across the display frame types $404_1 \ldots 404_N$. In another embodiment, the number 408 of the blanking periods 302 can increase monotonically, while the width 409 of the blanking periods 302 can decrease monotonically. Table 2 illustrates another example configuration of the first timing scheme:

TABLE 2

| Display Frame # in Frame Sequence | LHB period (time) | Number of LHBs in one display frame |
|---|---|---|
| 1 | X | Y |
| 2 | 2*X | Y/2 |

TABLE 2-continued

| Display Frame # in Frame Sequence | LHB period (time) | Number of LHBs in one display frame |
|---|---|---|
| 3 | 4*X | Y/4 |
| ... | ... | ... |
| N | (2*N)*X | Ceiling(Y/(2*N)) |

The spectrum of audible noise has odd harmonics of a fundamental frequency matching a rate of the blanking periods 302. So, in an embodiment of the first timing scheme, the number 408 of blanking periods 302 is increases or decreased monotonically by even multiples.

In the second timing scheme, a phase 410 of the blanking periods 302 is changed from one frame to the next. As discussed above, a frame includes a plurality of lines corresponding to the rows of the pixel array 216. Each line includes an index (e.g., $1^{st}$ line, $2^{nd}$ line, and so on). The phase 410 of the blanking periods 302 can be changed by adjusting the line index prior to and after the first blanking period 302 in the sequence. Alternatively, only one of the line index prior to or after the first blanking period 302 is adjusted (i.e., the first blanking period has a different width than each other blanking period in the sequence). The phase can shift left or right in time monotonically from one display frame to the next. Alternatively, rather than shifting the phase frame-to-frame, the phase can be shifted across the same frame types. For example, the type one frame in one frame sequence can have one phase and the type one frame in the next frame sequence can have a different phase.

Figure 5:
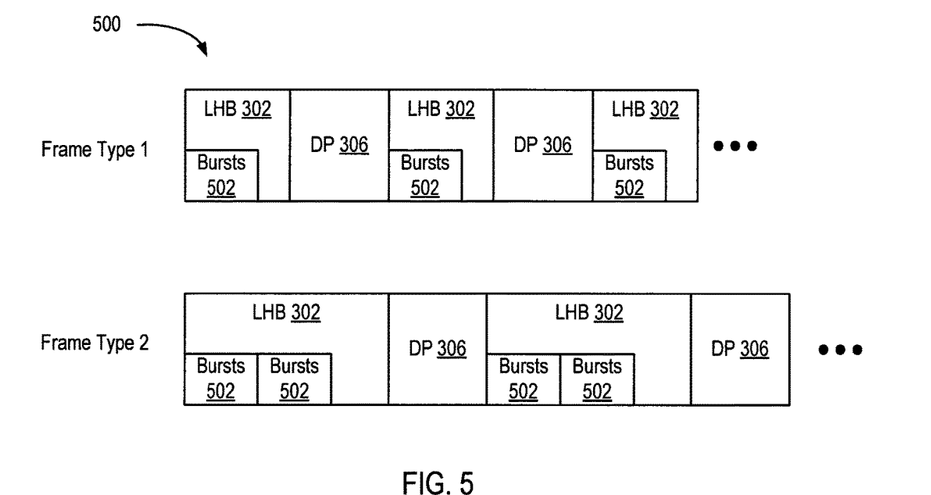
FIG. 5 is a block diagram illustrating a first timing scheme according to an embodiment.

FIG. 5 is a block diagram illustrating a first timing scheme 500 according to an embodiment. In the example, the first timing scheme 500 is for two different frame types per frame sequence. For frame type 1, each LHB 302 includes a sequence of bursts 502. For frame type 2, each LHB 302 is longer than each LHB 302 in frame type 1. Moreover, the frame type 2 includes less LHBs 302 per frame. In the frame type 2, each LHB 302 includes two sequences of bursts 502 (e.g., the number of bursts per LHB 302 is increased with respect to the frame type 1). The example of FIG. 5 can be extended for any number of frame types per frame sequence.

Figure 6:
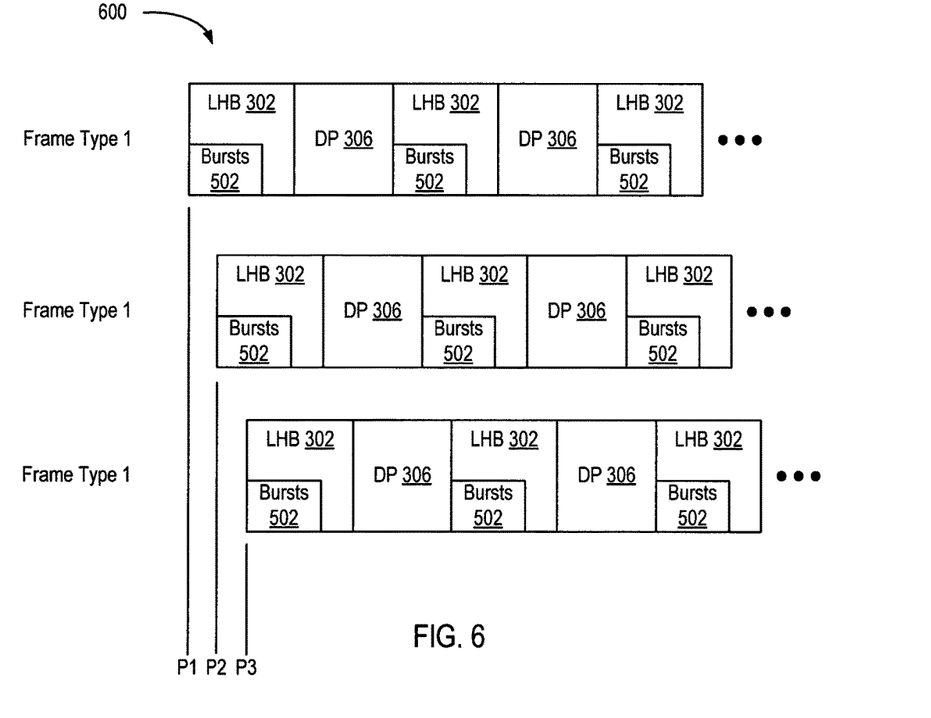
FIG. 6 is a block diagram illustrating a second timing scheme according to an embodiment.

FIG. 6 is a block diagram illustrating a second timing scheme 600 according to an embodiment. In the example, the second timing scheme 6700 is for three different phases for the frame type 1. A first instance of the frame type 1 in the frame sequence has a first phase P1. A second instance of the frame type 1 in the frame sequence has a second phase P2. A third instance of the frame type 1 in the frame sequence has a third phase P3. The example of FIG. 6 can be extended for any number of phases for the frame type 1. After the last phase (e.g., P3), the next instance of frame type 1 has the phase P1 (e.g., P1, P2, P3, P1, P2, P3, etc.). Alternatively, the phase adjustment can snake (e.g., P1, P2, P3, P2, P1, P2, P3, etc.). While the example of FIG. 6 shows changing phase for one frame type, the same scheme can be employed for each frame type. In another embodiment, rather than varying the phase across instances of the same frame type, the phase can be varied from frame-to-frame (regardless of frame type).

Figure 7:
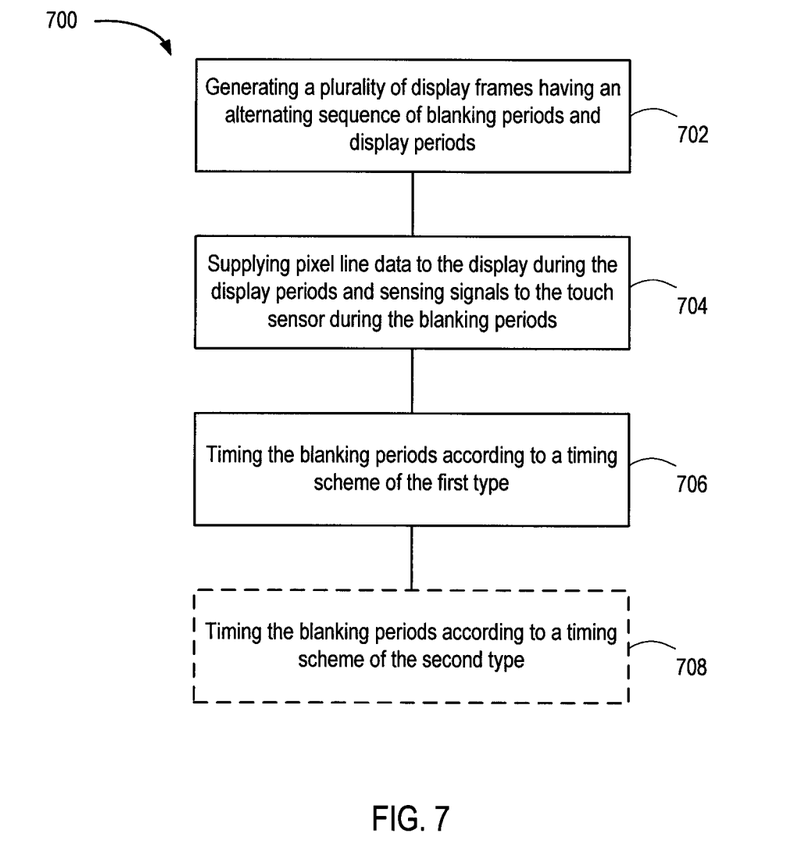
FIG. 7 is a flow diagram depicting a method of generating display frames for a display according to an embodiment.

FIG. 7 is a flow diagram depicting a method 700 of generating display frames for a display according to an embodiment. The blocks in the method 700 do not occur in sequential order, but are rather implemented concurrently by the processing system 110. The method 700 includes a block 702, where the display driver circuitry 204 generates a plurality of display frames from input display data. The display frames include an alternating sequence of blanking periods and display periods. In some cases, other periods can be inserted between certain pairs of the blanking periods and the display periods, as shown in the example of FIG. 3.

The method 700 includes a block 704, where the display driver circuitry 204 supplies pixel line data to the display during the display periods and the sensor circuitry 202 provides sensing signals to the touch electrodes (collectively referred to as a touch sensor) during the blanking periods.

The method 700 includes a block 706, where the control circuits 210 time the blanking periods according to the first timing scheme. The control circuits 210 control both the number of blanking periods per display frame and the width (duration) of the blanking periods across frames. The control circuits 210 can receive a schedule for the first timing scheme from the processing circuits 222 (e.g., a schedule of Table 1 above, a schedule of Table 2 above, etc.).

The method 700 can optionally include a block 708, where the control circuits 210 time the blanking periods according to the second timing scheme. The control circuits 210 control the phase of the blanking period sequence from frame-to-frame or instance-to-instance of each frame type. The control circuits 210 can receive a schedule for the second timing scheme from the processing circuits 222.

The embodiments and examples set forth herein were presented to explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

I claim:

1. A method of driving a display having a touch sensor, comprising:
   generating a plurality of display frames having an alternating sequence of display periods and blanking periods, wherein the plurality of display frames comprises display frames of a first type and display frames of a second type;
   supplying pixel line data to the display during the display periods and sensing signals to the touch sensor during the blanking periods; and
   timing the blanking periods so that the display frames of the first type have a first number of blanking periods and that the display frames of the second type have a second number of blanking periods, wherein the second number less than the first number, and
   wherein the blanking periods in the display frames of the first type have a first width and the blanking periods in the display frames of the second type have a second width, the first width and the second width correspond to a sequential ordering of the display frames of the first type and the display frames of the second type, and the first number and the second number are inverse proportional to the sequential ordering.

2. The method of claim 1, wherein a first duration of each blanking period in the display frames of the first type is less than a second duration of each blanking period in the display frames of the second type.

3. The method of claim 2, wherein a ratio of the second duration to the first duration is an integer greater than or equal to two.

4. The method of claim 1, wherein a number of the display periods in each display frame of the first type is the same as a number of the display periods in each display frame of the second type.

5. The method of claim 1, wherein the step of supplying the sensing signals to the touch sensor during the blanking periods comprises generating discrete sensing bursts, and wherein the method further comprises:
   timing the sensing bursts so that a first number of the sensing bursts occur within each blanking period in the display frames of the first type and a second number of the sensing bursts occur within each blanking period in the display frames of the second type, and wherein the first number of sensing bursts is less than the second number of sensing bursts.

6. The method of claim 5, wherein a total number of the sensing bursts in each display frame of the first type is the same as a total number of the sensing bursts in each display frame of the second type.

7. The method of claim 1, wherein the plurality of display frames is a repeating frame sequence that includes a display frame of the first type followed by a display frame of the second type.

8. The method of claim 7, where the repeating frame sequence includes a first frame sequence followed by a second frame sequence, and wherein the method further comprises:
   changing a phase of the blanking periods in the display frames of the first type between the first frame sequence and the second frame sequence.

9. The method of claim 8, further comprising:
   changing a phase of the blanking periods in the display frames of the second type between the first frame sequence and the second frame sequence.

10. The method of claim 1, further comprising:
    changing a phase of the blanking periods in the plurality of display frames from one display frame to a next display frame.

11. A processing system for a display having a touch sensor, comprising:
    display driver circuitry configured to generate a plurality of display frames having an alternating sequence of display periods and blanking periods, and supply pixel line data to the display during the display periods, wherein the plurality of display frames comprises display frames of a first type and display frames of a second type;
    sensor circuitry configured to supply sensing signals to the touch sensor during the blanking periods; and
    control circuitry configured to time the blanking periods so that the display frames of the first type have a first number of periods and that the display frames of the second type have a second number of periods, wherein the second number is less than the first number, and
    wherein the blanking periods in the display frames of the first type have a first width and the blanking periods in the display frames of the second type of a second width, the first width and the second width correspond to a sequential ordering of the display frames of the first type and the display frames of the second type, and the first number and the second number are inverse proportional to the sequential ordering.

12. The processing system of claim 11, wherein a first duration of each blanking period in the display frames of the first type is less than a second duration of each blanking period in the display frames of the second type.

13. The processing system of claim 12, wherein a ratio of the second duration to the first duration is an integer greater than or equal to two.

14. The processing system of claim 11, wherein a number of the display periods in each display frame of the first type is the same as a number of the display periods in each display frame of the second type.

15. The processing system of claim 11, wherein the sensor circuitry is configured to supply the sensing signals to the touch sensor during the blanking periods by generating discrete sensing bursts, and wherein the control circuitry is configured to:
   time the sensing bursts so that a first number of the sensing bursts occur within each blanking period in the display frames of the first type and a second number of the sensing bursts occur within each blanking period in the display frames of the second type, and wherein the first number of sensing bursts is less than the second number of sensing bursts.

16. The processing system of claim 15, wherein a total number of the sensing bursts in each display frame of the first type is the same as a total number of the sensing bursts in each display frame of the second type.

17. The processing system of claim 11, wherein the plurality of display frames is a repeating frame sequence that includes a display frame of the first type followed by a display frame of the second type.

18. The processing system of claim 17, where the repeating frame sequence includes a first frame sequence followed by a second frame sequence, and wherein the control circuitry are configured to:
   change a phase of the blanking periods in the display frames of the first type between the first frame sequence and the second frame sequence.

19. The processing system of claim 18, wherein the control circuitry are configured to:
   change a phase of the blanking periods in the display frames of the second type between the first frame sequence and the second frame sequence.

20. An input device, comprising:
   a display;
   a touch sensor integrated in the display; and
   a processing system, including:
      display driver circuitry configured to generate a plurality of display frames having an alternating sequence of display periods and blanking periods, and supply pixel line data to the display during the display periods, wherein the plurality of display frames comprises display frames of a first type and display frames of a second type;
      sensor circuitry configured to supply sensing signals to the touch sensor during the blanking periods; and
      control circuitry configured to time the blanking periods so that the display frames of the first type have a first number of blanking periods and that the display frames of the second type have a second number of blanking periods, wherein the second number is less than the first number, and
      wherein the blanking periods of the display frames of the first type have a first width and the blanking periods of the display frames of the second type of a second width, the first width and the second width correspond to a sequential ordering of the display frames of the first type and the display frames of the second type, and the first number and the second number are inverse proportional to the sequential ordering.

21. The method of claim 1, further comprising timing the blanking periods so that the display frames of the first type have at least one of a first display period duration parameter, and a first phase parameter, and the display frames of the second type have at least one of a second duration parameter and a second phase parameter.

22. The method of claim 21, wherein the first duration parameter differs from the second duration parameter, and wherein the first phase parameter differs from the second phase parameter.

23. The processing system of claim 11, wherein the control circuitry is configured to time the blanking periods so that the display frames of the first type have at least one of a first display period duration parameter, and a first phase parameter, and the display frames of the second type have at least one of a second duration parameter and a second phase parameter.

24. The processing system of claim 23, wherein the first duration parameter differs from the second duration parameter, and wherein the first phase parameter differs from the second phase parameter.

25. The input device of claim 20, wherein a first duration of each blanking period in the display frames of the first type is less than a second duration of each blanking period in the display frames of the second type.

26. The input device of claim 20, wherein a number of the display periods in each display frame of the first type is the same as a number of the display periods in each display frame of the second type.

27. The input device of claim 20, wherein the sensor circuitry is configured to supply the sensing signals to the touch sensor during the blanking periods by generating discrete sensing bursts, and wherein the control circuitry is configured to:
   time the sensing bursts so that a first number of the sensing bursts occur within each blanking period in the display frames of the first type and a second number of the sensing bursts occur within each blanking period in the display frames of the second type, and wherein the first number of sensing bursts is less than the second number of sensing bursts.

28. The input device of claim 20, wherein the plurality of display frames is a repeating frame sequence that includes a display frame of the first type followed by a display frame of the second type, and wherein the method further comprises at least one of:
   changing a phase of the blanking periods in the display frames of the first type between the first frame sequence and the second frame sequence; and
   changing a phase of the blanking periods in the display frames of the second type between the first frame sequence and the second frame sequence.

* * * * *